Nov. 8, 1966    R. H. LYON    3,284,121
SEALS
Filed Oct. 7, 1964    2 Sheets-Sheet 1
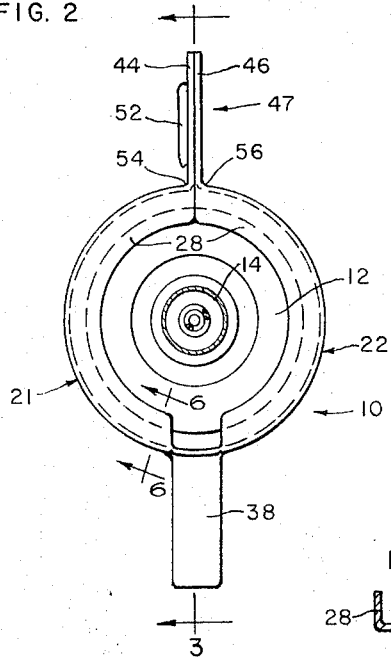
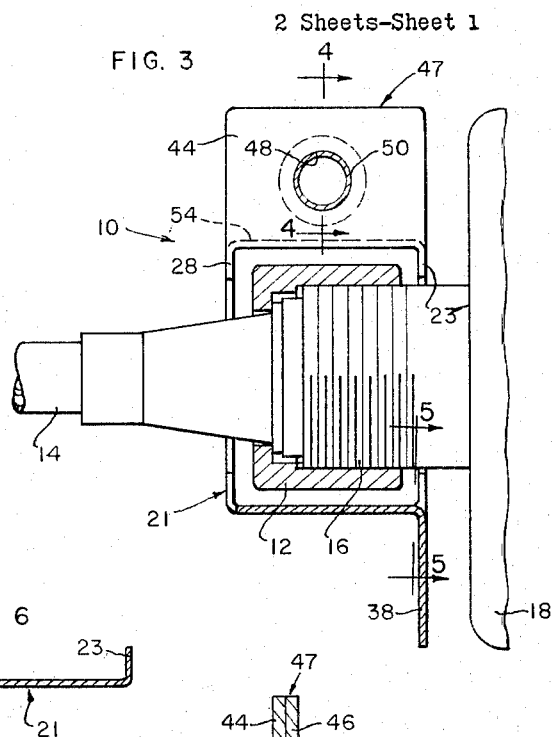
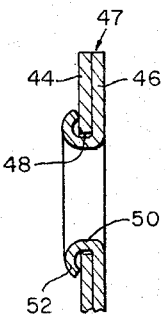
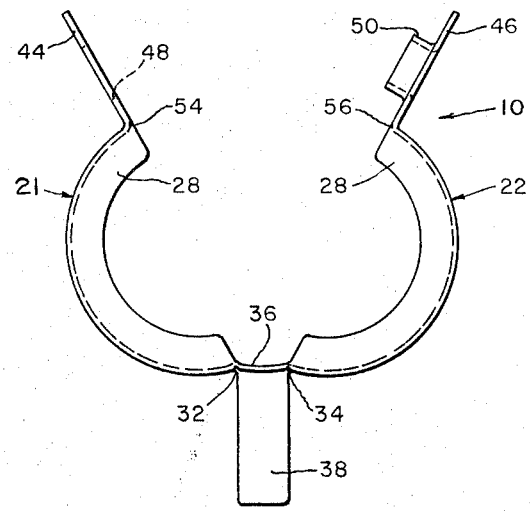
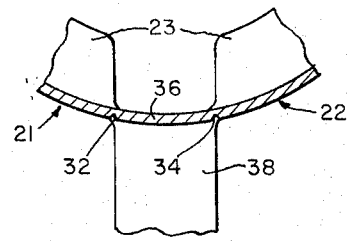
INVENTOR.
RICHARD H. LYON
BY
BUCKHORN, BLORE,
KLARQUIST & SPARKMAN
ATTORNEYS Nov. 8, 1966  R. H. LYON  3,284,121

SEALS

Filed Oct. 7, 1964  2 Sheets-Sheet 2

INVENTOR.
RICHARD H. LYON
BY
BUCKHORN, BLORE,
KLARQUIST & SPARKMAN
ATTORNEYS 3,284,121
Patented Nov. 8, 1966

3,284,121
SEALS
Richard H. Lyon, 10949 SE. Cherry Blossom Drive,
Portland, Oreg.
Filed Oct. 7, 1964, Ser. No. 402,224
2 Claims. (Cl. 292—307)

This invention relates to seals, and more particularly to seals for speedometer cable connectors.

In the use of seals such as, for example, seals for the connections of speedometer cables of automobiles, it is desirable that the seals be easily and quickly installed and removed, when desired, and that the seals also readily evidence any tampering therewith. Such seals known hitherto have been difficult and time consuming to install and remove, and it has also been possible to tamper with the seals without leaving clear evidence of such tampering. It would be desirable to provide a seal which is inexpensive in construction, is easy to install and remove, and cannot be removed, unfastened or thwarted without evident mutilation thereof, which indicates tampering.

An object of the invention is to provide new and improved seals.

Another object of the invention is to provide seals for automobile speedometer cable connectors.

A further object of the invention is to provide a seal which is easily installed and removed and which cannot be removed or thwarted without evident mutilation thereof.

Another object of the invention is to provide a simple, effective, inexpensive seal for speedometer cable connectors.

The invention provides seals in which there is provided an enclosing casing member having fastening portions which cannot be released without readily visible mutilation thereof. Preferably the seals include tear or frangible portions which permit easy, deliberate tearing or breaking apart of the seals for easy removal of the seals. In a seal forming a specific embodiment of the invention there is provided a generally U-shaped member having a pair of arcuate, encasing arms pivotally joined together at one end of each, with the other ends thereof having interconnecting portions, with flange portions on one side of each of the arms adapted to cover and prevent access to an enlarged portion of a connector of a speedometer cable and being provided with projections on the other side of the arms which extend behind the enlarged portion to hold the member on the enlarged portion and prevent removal thereof. A tear strip preferably is provided to secure the two arms together, and when it is desired to remove the seal for repair of the speedometer or the like, the tear strip is pulled, which separates the two arms and permits easy removal of the arms from the enlarged portion.

A complete understanding of the invention may be obtained from the following detailed description of seals forming specific embodiments thereof, when read in conjunction with the appended drawings, in which:

FIG. 1 is an elevation of a seal forming one embodiment of the invention in open condition;

FIG. 2 is an elevation view of the seal of FIG. 1 mounted on a connector of a speedometer cable and a speedometer;

FIG. 3 is a vertical section taken along line 3—3 of FIG. 2;

FIG. 4 is a vertical section taken along line 4—4 of FIG. 3;

FIG. 5 is an enlarged vertical section taken along line 5—5 of FIG. 3;

FIG. 6 is a vertical section taken along line 6—6 of FIG. 2;

Figure 7:
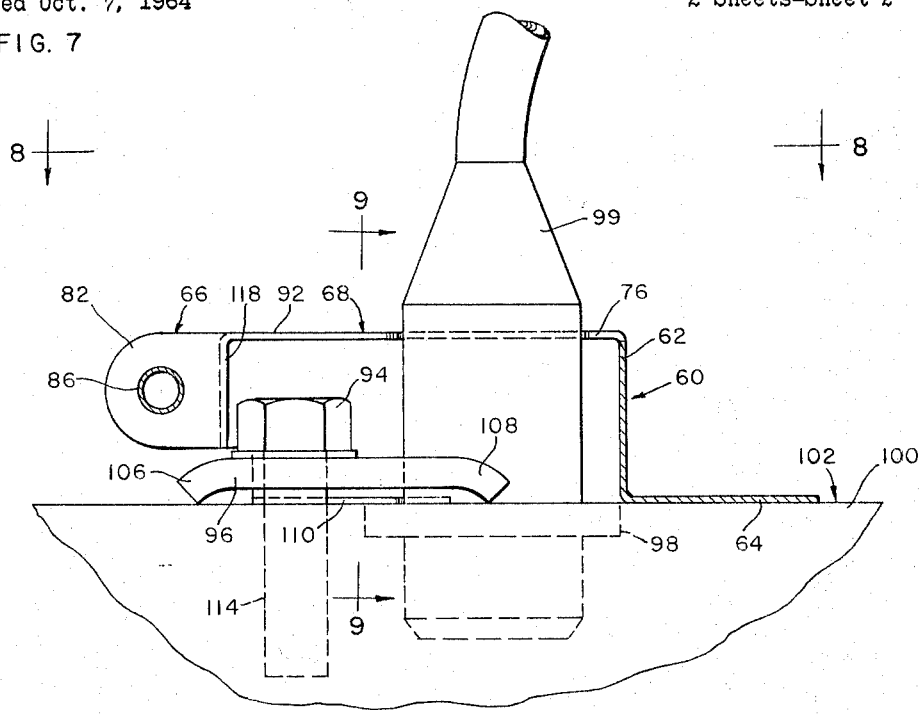
FIG. 7 is a fragmentary section of a speedometer and a speedometer cable and connector having thereon a seal forming an alternate embodiment of the invention.

Referring now in detail to the drawings, there is shown in FIGS. 1 to 5 a seal 10 loosely enclosing a connector nut 12 on a speedometer cable 14 which is screwed onto a threaded hollow boss 16 projecting from the rear of a speedometer casing 18. The nut 12 forms an enlarged connector portion of a greater external diameter than that of the boss 16 and is spaced from the rear wall of the speedometer casing 18. The seal 10 has arcuate, channel-like arms 21 and 22 having opposed flange portions 23 and 28 and defining a bored casing loosely fitting on the boss 16. The bores defined by the edges of the flanges are substantially smaller than the effective external diameter of the nut 12 so that the seal 10 cannot be pulled off the nut 12 and access of the nut cannot be effected without readily apparent mutilation of the seal. The seal 10 is a one-piece member formed from sheet metal to provide arms 21 and 22 which are formed into arcuate, almost semi-circular channels having the overhanging, enclosing arcuate flanges 23 at one side of each and having the overhanging, enclosing arcuate flanges 28 at the other side thereof. The base portions of the channel-like arms 21 and 22 are secured by weakened or scored portions 32 and 34, respectively, to a tear strip 36 having a pulling tab 38, the portion of the tear strip 36 between the two score lines 32 and 34 being slightly arcuate in shape and forming, in effect, a continuation of the bases of the arms 21 and 22. The weakened portions 32 and 34, in effect, hinge the arms 21 and 22 to the tear strip 36 to permit movement of the arms from the expanded or open positions thereof shown in FIG. 1 to the closed or operative positions thereof shown in FIG. 2, in which the arms and the tear strip define an annular housing. When the arms are in their open positions, as shown in FIG. 1, the seal is generally U-shaped.

The arms 21 and 22 are provided at their outer or free ends with radially extending tabs 44 and 46 forming a deformable fastener 47, the tab 44 being provided with a hole 48 therein through which a tubular rivet 50 drawn from the tab 46 is adapted to extend. To install the seal 10 in a position covering and preventing tampering with or access to the nut 12, the seal while in its open condition, as illustrated in FIG. 1, is placed over the connector nut 12 and the two tabs 44 and 46 are brought together with the rivet 50 extending through the hole 48 in the tab 44 and a known plier-like upsetting tool is utilized to form an eyelet-like head 52 on the rivet 50, which locks the seal in its closed, operative position preventing any access to the nut 12, with the arcuate flanges 23 extending under the nut 12 so that the seal 10 cannot be pulled off the nut 12 without deforming the flanges 23. The rivet head 52 also may not be removed sufficiently for the rivet 50 to be pulled through the hole 48 without evident mutilation of the rivet 50. To remove the seal, the user merely grasps the pull tab 38 with a pair of pliers and tears out the tear strip 36 to separate the two arms 21 and 22, which may then be bent apart at corners 54 and 56 to open the arms and permit the seal to be removed from the nut 12. Then, after the speedometer is repaired, a new, similar seal is installed and is placed around the nut to prevent any tampering therewith.

Figure 8:
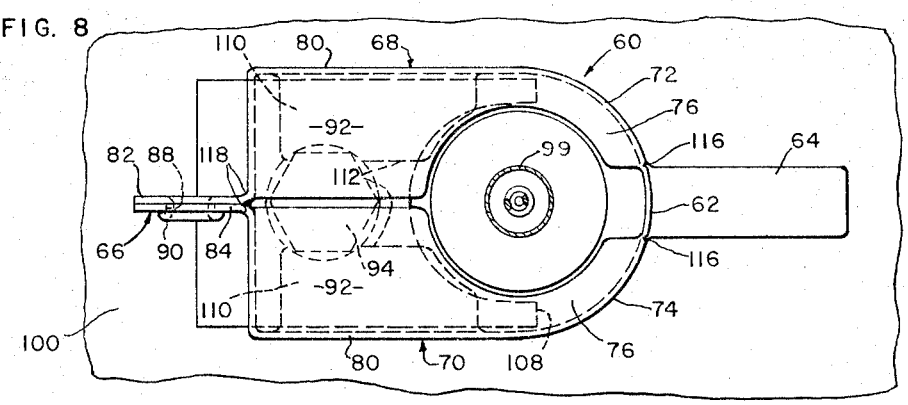
FIG. 8 is a section taken along line 8—8 of FIG. 7.
Figure 9:
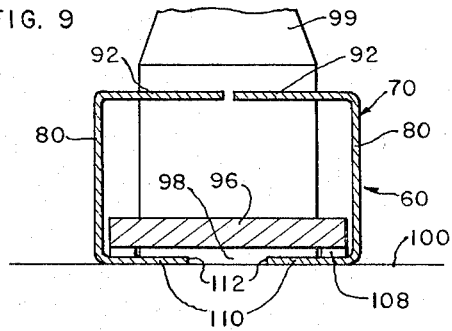
FIG. 9 is a section taken along line 9—9 of FIG. 7.

A seal 60 (FIGS. 7 to 9) forming an alternate embodiment of the invention, like the seal 10, is of one-piece construction and is easily and inexpensively manufactured and easily installed and removed. The seal 60 includes a tear strip 62 having a pull tab 64 integral therewith, and a deformable fastener 66. The seal 60 includes a pair of arms 68 and 70 having arcuate portions 72 and 74 provided with flanges 76. The arms also have straight extension portions 80, the extending portions being provided with tabs 82 and 84 having, respectively, a tubular rivet 86 and a hole 88 therein for receiving the rivet 86 and defining therewith the fastener 66, an eyelet type crimp or head 90 being formed by a known plier-like upsetting tool on the end of the rivet 86 to lock the tabs 82 and 84 together.

The extension portions 80 have outer overhanging flanges 92 adapted to cover a capscrew 94 and a speedometer cable end retaining clamp 96, which together serve to hold a flanged end 98 of a speedometer cable 99 in desired position on a casing 100 of a transmission housing 102, the cable end 98 forming the connector portion of the speedometer cable, this construction being provided on one of the well known makes of automobiles. The clamp 96 is provided with bent end portions 106 and 108 and the central portion thereof is raised from the surface of the wall of the casing 100. Projecting flanges 110 of the portions 80 are adapted to project under the central portion of the clamp 96 between the central portion of the clamp and the adjacent wall of the casing 100 and retain the seal in position surrounding the cable end 98 and covering the capscrew 94 and clamp 96 so that there is no access thereto without permanent, readily apparent mutilation of the seal. Edges 112 of the flanges 110 are spaced apart so as to provide clearance for shank 114 of the capscrew 94 when the arms 68 and 70 of the seal 60 are in their closed, operative positions. The flanges 76 and 92 define a generally cylindrical hole fitting closely around the cable 99.

The tear strip 62 is arcuate to form a portion of a cylinder with the bases of the arcuate portions 72 and 74 and is connected to the bases by scored or weakened frangible portions 116 so that it may be easily torn therefrom for removal of the seal 60 from the speedometer cable, portions 118 joining the tabs 82 and 84 to the bases of the arms 68 and 70 being easily bendable to permit such removal.

The above-described seals 10 and 60 are easily installed and removed, and cannot be thwarted or removed without readily evident mutilation thereof. The seals are quite effective in providing permanent evidence of unauthorized tampering with the sealed speedometer connections, and are quite inexpensive in manufacture. While the deformable fastener portions 47 and 66 have been illustrated as interlocking rivet constructions, they obviously may be other types of interlocking members which cannot be disengaged without readily apparent mutilation. The seals are shown as of one-piece sheet metal constructions but may be of diecast or plastic construction requiring mutilation or breakage for access to the sealed parts or removal of the seals. Also, other frangible or breakaway portions may be provided in place of the tear strips both in the sheet metal constructions and in the plastic constructions. In fact, the entire seal may be of frangible material and require destruction both to obtain access to the sealed parts and to remove the seal from the sealed parts. Further, the fastener portions of the seals instead of being the two end portions of the seals may be tabs having fastener elements which, instead of interlocking together, interlock permanently with portions of the speedometer casing and require mutilation or breakage of the seals to permit removal of the seals.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A seal comprising
    a generally U-shaped member of sheet material including a pair of arms, a tear strip portion connecting adjacent ends of the arms together and a pull tab joined to the tear strip portion,
    the member having a pair of score lines extending generally parallel to the longitudinal axis of the member and defining the tear strip portion and weakening the member at the junctures of the tear strip portion and the arms,
    the other ends of the arms having means associated therewith to secure said ends against separation without mutilation,
    the arms having opposed projections at edges thereof adapted to project under an enlarged portion of a releasable connector with the member in a position enclosing the connector to prevent tampering therewith.

2. The seal of claim 1 wherein the U-shaped member is composed of sheet metal.

References Cited by the Examiner

UNITED STATES PATENTS

| | | | |
|---|---|---|---|
| 565,874 | 8/1896 | Bernstein | 292—307.2 |
| 770,257 | 9/1904 | Brooks | 292—307.2 |
| 1,028,253 | 6/1912 | Murray | 285—80 |
| 1,039,576 | 9/1912 | Mueller | 292—307 |
| 2,012,543 | 8/1935 | Nolan | 292—307 |
| 2,162,182 | 7/1939 | Smith | 220—54 |
| 3,204,805 | 9/1965 | May | 220—54 |

CARL W. TOMLIN, *Primary Examiner.*

R. GIANGIORGI, *Assistant Examiner.*